(12) United States Patent
Van Dyk et al.

(10) Patent No.: US 7,133,727 B2
(45) Date of Patent: *Nov. 7, 2006

(54) SYSTEM AND METHOD FOR CONTINUOUS ONLINE SAFETY AND RELIABILITY MONITORING

(75) Inventors: Paul J. Van Dyk, Keysborough (AU); Robert S. Adamski, Loudon, TN (US); Les Powers, Irvine, CA (US); Robin McCrea-Steele, Lake Forest, CA (US)

(73) Assignee: Invensys Systems, Inc., Foxboro, MA (US)

( * ) Notice: Subject to any disclaimer, the term of this patent is extended or adjusted under 35 U.S.C. 154(b) by 109 days.

This patent is subject to a terminal disclaimer.

(21) Appl. No.: 10/684,329

(22) Filed: Oct. 10, 2003

(65) Prior Publication Data
US 2005/0027374 A1 Feb. 3, 2005

Related U.S. Application Data

(60) Provisional application No. 60/491,999, filed on Aug. 1, 2003.

(51) Int. Cl.
*G05B 11/01* (2006.01)
*G05B 9/02* (2006.01)
(52) U.S. Cl. .............................. 700/21; 700/78; 700/79; 700/80; 700/81; 702/181; 702/182; 702/183; 702/184; 714/4; 714/6; 714/36
(58) Field of Classification Search .................. 700/21, 700/78, 79, 80, 81, 82; 702/181, 182, 183, 702/184, 185; 719/4, 6, 36
See application file for complete search history.

(56) References Cited

U.S. PATENT DOCUMENTS

| 4,632,802 | A | 12/1986 | Herbst et al. | |
| 6,550,018 | B1* | 4/2003 | Abonamah et al. | 714/6 |
| 6,732,300 | B1* | 5/2004 | Freydel | 714/36 |
| 2002/0010874 | A1* | 1/2002 | Barthel | 714/4 |
| 2004/0186927 | A1* | 9/2004 | Eryurek et al. | 710/12 |
| 2004/0243260 | A1* | 12/2004 | Law et al. | 700/86 |

OTHER PUBLICATIONS

SILCalc User Guide, Asset Integrity Management Limited, Issued Jul. 31, 2002, Doc. No. AIM0013 Rev.O.
Quantitative Risk & reliability Assessment, "An Introductory Course on Fault Tree Analysis and Course on the SAPHIRE Tool," Saphire.ppt Jul. 2002.

* cited by examiner

*Primary Examiner*—Ramesh Patel
(74) *Attorney, Agent, or Firm*—Cooley Godward LLP

(57) ABSTRACT

A system and method for continuous online safety and reliability monitoring is disclosed. The method includes the steps of obtaining operating information about at least one of a plurality of instrumented function components, which are part of an instrumented function, and determining a probability of failure on demand for the instrumented function based on the operating information. In variations, instantaneous probability of failure on demand, online mean time to failure (MTTF), and online safety integrity level (SIL) are also calculated for an instrumented function. In other variations of the invention, alarms are reported to an operator based on the variance indicating the probability of failure on demand for the instrumented function is too high. In yet further variations, the system allows a user to predict probability of failure on demand values into the future based on hypothetical and/or future planned test times.

17 Claims, 9 Drawing Sheets

SYSTEM AND METHOD FOR CONTINUOUS ONLINE SAFETY AND RELIABILITY MONITORING

This application claims priority under 35 U.S.C. § 119(e) to U.S. Provisional Patent Application Ser. No. 60/491,999 filed Aug. 1, 2003, entitled: SYSTEM AND METHOD FOR CONTINUOUS ONLINE SAFETY AND RELIABILITY MONITORING, which is incorporated herein by reference.

BACKGROUND OF THE INVENTION

1. Field of the Invention

The present invention relates generally to control and monitoring systems, and more specifically to industrial safety and reliability control and monitoring systems.

2. Discussion of the Related Art

Modern industrial systems and processes tend to be technically complex, involve substantial energies and monetary interests, and have the potential to inflict serious harm to persons or property during an accident. Although absolute protection may not be possible to achieve, risk can be reduced to an acceptable level using various methods to increase an industrial system's safety and reliability and mitigate harm if an event, e.g., a failure, does occur.

In the context of safety systems, one of these methods includes utilization of one or more safety instrumented systems (SIS). A safety instrumented system (SIS) is an instrumented system used to implement one or more safety instrumented functions (SIF), and is composed of sensors, logic solvers and final elements designed for the purposes of: taking an industrial process to a safe state when specified conditions are violated; permitting a process to move forward in a safe manner when specified conditions allow (permissive functions); and/or taking action to mitigate the consequences of an industrial hazard.

A safety instrumented function (SIF) is a function implemented by a SIS, which is intended to achieve or maintain a safe state for a process with respect to a specific event, e.g., a hazardous event. Hardware to carry out the SIF typically includes a logic solver and a collection of sensors and actuators for detecting and reacting to events, respectively.

To direct appropriate design and planned maintenance of a SIF, safety standards bodies have established a system that defines several Safety Integrity Levels (SIL) that are appropriate for a SIF depending upon the consequences of the SIF failing on demand. According to the International Electrotechnical Commision (IEC) standard 61508, safety integrity level (SIL) is a measure of the risk reduction provided by a SIF based on four discrete levels, each representing an order of magnitude of risk reduction. As shown in Table 1, each SIL level is associated with a designed average probability of failure on demand (PFD). For example, a SIL 1 means that the maximum probability of failure is 10% (i.e., the SIF is at least 90% available), and a SIL 4 means that the maximum probability of failure is 0.01% (i.e., the SIF is at least 99.99% available).

TABLE 1

| DEMAND MODE OF OPERATION | | |
|---|---|---|
| Safety Integrity Level (SIL) | Target Average Probability of Failure on Demand | Target Risk Reduction |
| 4 | $\geq 10^{-5}$ to $<10^{-4}$ | >10,000 to $\leq$100,000 |
| 3 | $\geq 10^{-4}$ to $<10^{-3}$ | >1000 to $\leq$10,000 |

TABLE 1-continued

| DEMAND MODE OF OPERATION | | |
|---|---|---|
| Safety Integrity Level (SIL) | Target Average Probability of Failure on Demand | Target Risk Reduction |
| 2 | $\geq 10^{-3}$ to $<10^{-2}$ | >100 to $\leq$1000 |
| 1 | $\geq 10^{-2}$ to $<10^{-1}$ | >10 to $\leq$100 |

For continuous or high demand mode of operation, the following Table 2 applies:

TABLE 2

| CONTINUOUS MODE OF OPERATION | |
|---|---|
| Safety integrity Level | Target Frequency of Dangerous Failures to perform the safety instrumented function (per hour) |
| 4 | $\geq 10^{-9}$ to $<10^{-8}$ |
| 3 | $\geq 10^{-8}$ to $<10^{-7}$ |
| 2 | $\geq 10^{-7}$ to $<10^{-6}$ |
| 1 | $\geq 10^{-6}$ to $<10^{-5}$ |

Consistent with existing, standardized methodology, during design of a safety instrumented system (SIS), safety integrity level (SIL) requirements are established for each SIF based upon the impact of the specific hazardous event that the SIF is intended to prevent. For example, a SIL level of 1 may be assigned to a hazardous event that imparts only minor property damage, whereas a SIL of 4 may be assigned to a SIF that is intended to prevent an event that would produce catastrophic community-wide consequences.

After a SIL is assigned to each SIF, each SIF is designed to operate within the designed average probability of failure on demand (PFD) that corresponds to the SIL assigned to the SIF. Because a SIF is typically comprised of a collection of instrumented function components (e.g., a logic solver, sensors, and actuators), and each of the instrumented function components have a respective average PFD, which affects the overall average PFD of the SIF, a designer has some flexibility in the way the overall average PFD is achieved. For example, by assuming a set of environmental conditions (e.g., humidity, temperature and pressure) that the instrumented function components will operate under, a designer is able to arrive at an overall average PFD by establishing regimented testing schedule for each of the instrumented function components.

Thus, once a SIS is commissioned, a plant engineer is able to estimate the SIL level of a particular SIF as long as the actual maintenance and environmental conditions do not vary from the assumed design conditions.

Unfortunately, after a SIS is operational, a plant engineer is unable to determine what the average PFD or SIL levels are for a SIF once actual testing varies from the regimented test schedule. Furthermore, the actual PFD and SIL levels will vary depending upon actual environment conditions, and as a consequence, a plant engineer will face further uncertainty as to what the actual PFD and SIL level is for the SIF.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

SUMMARY OF THE INVENTION

Figure 1:
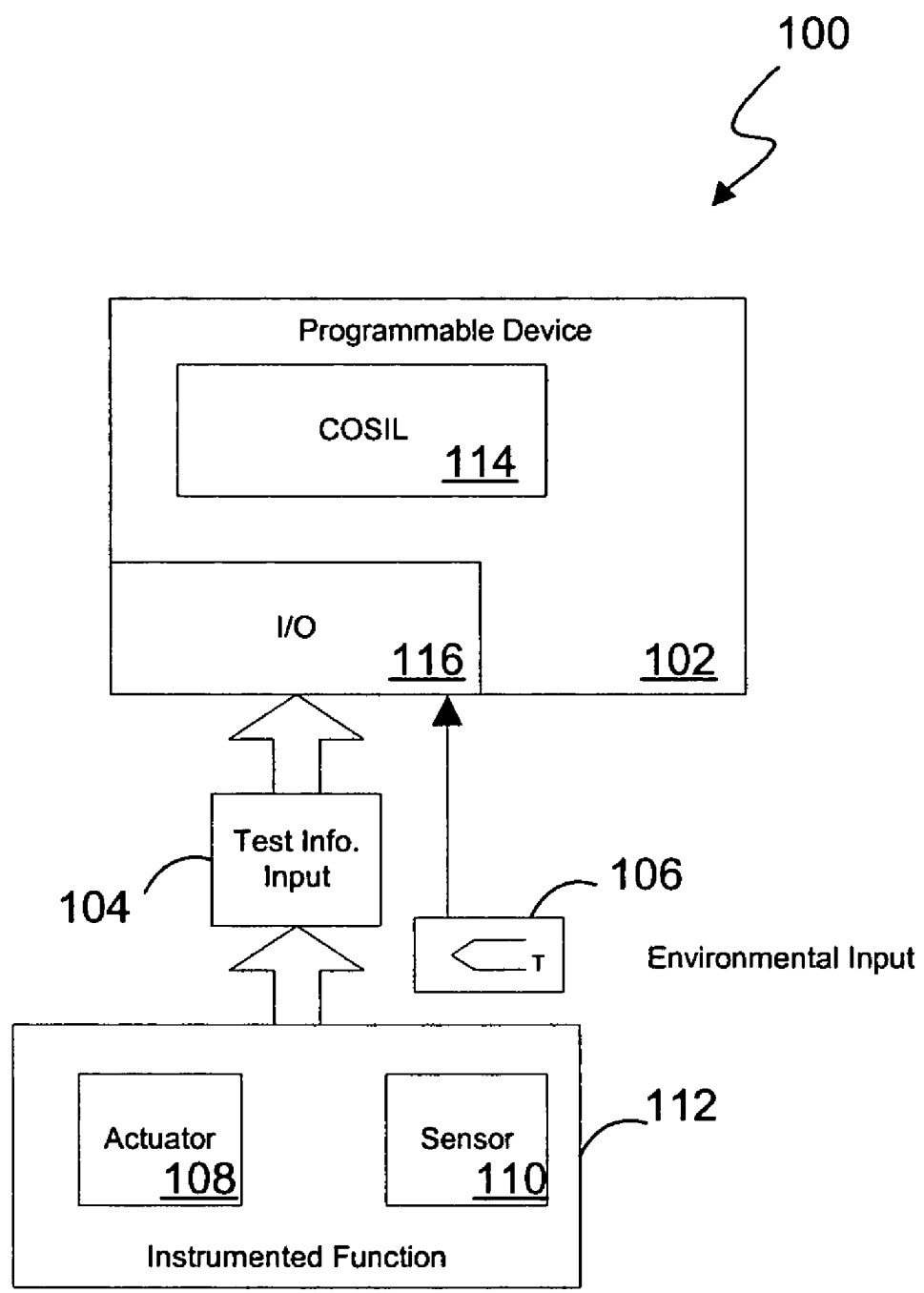
FIG. 1 is a is a block diagram of an exemplary industrial system in which a safety and reliability monitoring system according to one embodiment of the present invention is implemented.

In one embodiment, the invention may be characterized as a method, and means for accomplishing the method, for managing a safety instrumented function including a plurality of instrumented function components, the method including: obtaining operating information about at least one of a plurality of instrumented function components; determining a probability of failure on demand for the safety instrumented function based on the operating information; comparing the probability of failure on demand with a designed probability of failure on demand for the safety instrumented function to establish a variance; and managing the plurality of instrumented function components based on the variance.

In another embodiment, the invention may be characterized as method for generating instantaneous safety availability information relating to an instrumented function, the method including: receiving a time of a test performed on an instrumented function component of the instrumented function; determining an elapsed time between the time of the test and a particular time; and calculating the safety availability information for the instrumented function based on the elapsed time.

In a further embodiment, the invention may be characterized as a method for generating information pertinent to management of a safety instrumented function comprising: receiving, over a period of time, test information for instrumented function components in the safety instrumented function; calculating, as a function of the test information, a plurality of probability of failure on demand values, wherein each of the probability of failure on demand values represents a probability of failure on demand of the safety instrumented function at a different point in time within the period of time; and generating display information representative of the plurality of probability of failure on demand values.

In yet another embodiment, the invention may be characterized as computer-executable code to generate safety availability information for an instrumented function, the code comprising instructions for: obtaining operating information about at least one of a plurality of instrumented function components, wherein the instrumented function includes the plurality of instrumented function components; determining a probability of failure on demand for the instrumented function based on the operating information; generating the safety availability information based on the probability of failure on demand; and providing the safety availability information to the personnel.

In yet a further embodiment, the invention may be characterized as a processor readable medium having instructions stored thereon for execution by the processor to perform a method for providing, to personnel, safety availability information for a plurality of instrumented functions, the method comprising: receiving safety availability information about an instrumented function wherein the safety availability information is selected from the group consisting of a probability of failure on demand, a safety integrity level and a risk reduction factor; generating a graphical user interface incorporating the safety availability information; and providing the graphical user interface to a display.

DETAILED DESCRIPTION

In one aspect, the present invention is directed to a safety and reliability monitoring system, also referred to herein as a COSIL™ system, which provides historical, real time and predictive probability failures for an online instrumented system, e.g., a safety instrumented system (SIS), based on events which occur during operation and maintenance of the instrumented system.

Unlike current approaches for evaluating safety and reliability, which are generally based upon static offline calculations using assumed average conditions over the life cycle of the instrumented system, the present invention according to several embodiments is capable of providing dynamic, online calculations of average probability of failure on demand, instantaneous probability of failure on demand, and safety integrity level (SIL) using actual events (e.g. time of test) in an industrial plant. In some embodiments, the present invention also provides reliability information (e.g., mean time to fail (MTTF)) based on actual events. As a consequence, the inventive COSIL™ system may be employed to provide accurate continuous online status information for an instrumented function, e.g., a safety instrumented function.

The term continuous as used herein should not necessarily be construed to mean that calculations are continually performed (i.e., without interruption). The COSIL™ system according to several embodiments, however, does allow a plant engineer to obtain substantially continuous values of PFD, SIL and/or MTTF, if so desired. It should be recognized that the COSIL™ system also allows calculations to be performed at less frequent intervals, e.g., daily, weekly or monthly.

Referring first to FIG. 1 shown is a block diagram of an exemplary industrial system 100 in which a COSIL™ system according to one embodiment of the present invention is implemented. As shown, the system 100 includes a programmable device 102 in communication, via a test input 104, with an actuator 108 and a sensor 110 which implement an instrumented function 112, e.g., a safety instrumented function (SIF). Also shown is an environmental input 106 which may be implemented to provide additional input to the COSIL™ module 114.

The programmable device 102 may be realized using any one of a variety of devices, which have input/output (I/O) functionality and contain a CPU and memory and (not shown). The programmable device 102 may be, for example and without limitation, an intelligent field device, a safety controller, a programmable logic controller (PLC), a controller, a general purpose computer, a personal digital assistant (PDA) or potentially any other device that includes a processor, memory and input/output capability.

The instrumented function 112 represents a specific function executed by the 108 actuator and sensor 110 to achieve or maintain a safe state for a process with respect to a specific event, e.g., a hazardous event.

The sensor 110 and actuator 108, also referred to herein as instrumented function components, respectively monitor and react to process conditions in the industrial system 100 in order to help ensure that the instrumented function 112 is carried out on demand. Although one sensor 110 and one actuator 108 are shown for simplicity, it should be recognized that there are potentially multiple actuators and sensors associated with a particular instrumented function, e.g., a particular safety instrumented function (SIF).

One of ordinary skill in the art will recognize that there are several varieties of both sensors and actuators. In one embodiment, for example, the sensor 110 is a pressure sensor and the actuator 108 controls a shut off valve.

The test input portion 104 in some embodiments is an automated test input unit, that provides test information, e.g., a most recent test time and date, for the actuator 108 and/or sensor 110 to the COSIL™ module 114 without human intervention. In one embodiment, for example, the actuator 108 and sensor 110 are coupled to the programmable device 102 via a communication link. In other embodiments, the test input portion 104 is a keypad or other user interface device, which allows a plant engineer, for example, to provide test information for the actuator 108 and/or sensor 110 to the programmable device 102.

Within the programmable device 102 are shown the COSIL™ module 114 and an I/O module 116. The COSIL™ module 114 according to several embodiments is implemented by software that is read from a memory and processed by a CPU (not shown) of the programmable device 102. The COSIL™ module 114 generally comprises processor-executable code (a "COSIL™ program") specifically designed to calculate, as a function of operating information for the instrumented function components 108, 110, a probability that the instrumented function 112 will fail on demand.

As discussed further herein, the COSIL™ program may be created by one of several quantitative risk/reliability analysis (QRA) methodologies including, but not limited to, function block diagram analysis, fault tree analysis, structured text techniques, simple equation methodology, Markov modeling and reliability block diagram methodology.

Figure 2:
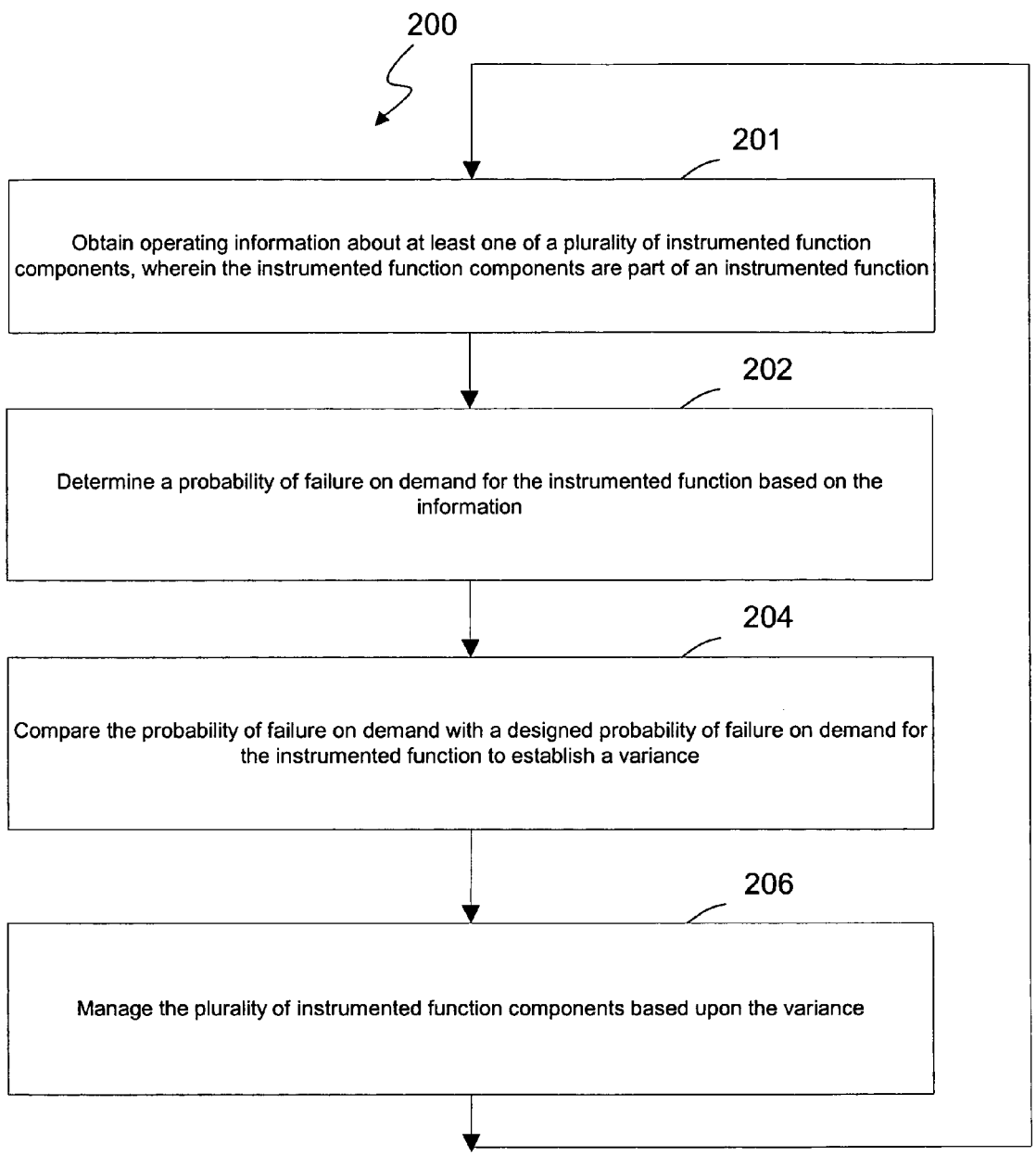
FIG. 2 is a flow chart illustrating steps carried out by the safety and reliability monitoring system of FIG. 1 according to several embodiments of the present invention.

While referring to FIG. 1, simultaneous reference will be made to FIG. 2, which is a flow chart 200 illustrating steps carried out by the COSIL™ module 114 according to several embodiments of the present invention.

In operation, the COSIL™ module 114 initially obtains operating information about at least one of the instrumented function components 108, 110 (Step 201). In several embodiments the operating information includes test information that includes for example, a time and date when a test is successfully performed. In the present embodiment, the COSIL™ module 114 receives the operating information via the test information input portion 104. In some embodiments, this test information is saved in a memory of the programmable device 102, which allows the COSIL™ program to calculate an elapsed time between the time of the test and a present (or future) time. In other embodiments, a timer is triggered that tracks the elapsed time between the time of the test and a present time.

Although certainly not required, the operating information received at Step 201 may include environmental information, which characterizes the operating environment for the instrumented function components 108, 110 (e.g., humidity, temperature and pressure). In this way, the COSIL™ module 114 is provided with actual environmental conditions for the instrumented function components 108, 110 in the instrumented function 112.

It should be recognized that various modes of operation of the COSIL™ module 114 are contemplated in which, for example, only test information is received, only environmental information is received, or both test and environmental information are received at the COSIL™ module 114. It is also further contemplated that in one embodiment, both test and environmental information are received at the COSIL™ module 114, but the COSIL™ module 114 only utilizes either the test or environmental information.

Although the COSIL™ module 114 has been described as receiving test data for one of the instrumented function components 108, 110 in the instrumented function 112, it should be recognized that in several embodiments, the COSIL™ module 114 receives test information on an ongoing (e.g., substantially continuous) basis for potentially hundreds of instrumented function components, and is able to establish an elapsed time since a last test for each of the hundreds of instrumented function components.

Once the COSIL™ module 114 has received the operating information about at least one of the instrumented function components 108, 110, the COSIL™ module 114 calculates a probability of failure on demand (PFD) for the instrumented function 112 based on the operating information (Step 202). Although operating information for one or more of the instrumented function components 108, 110 may be received at any given time, it should be recognized that the PFD for the instrumented function 112 is calculated as a function of a PFD for each of the instrumented function components 108, 110 that contribute to the availability of the instrumented function 112 on demand.

In some embodiments, the probability of failure on demand calculated in Step 202 is an instantaneous probability of failure on demand, which is calculated using the following equation:

$$PFD_{INST} = 1 - e^{-\lambda t} \qquad \text{Eq. (1)}$$

where $\lambda$ is the failure rate for the element measured in a number of failures per unit of time and t is the elapsed time since the last test of the element. The failure rate $\lambda$, and hence $PFD_{INST}$, will be typically be a function of environmental conditions such as temperature, pressure and humidity.

In other embodiments, the probability of failure on demand determined in Step 202 is an average probability of failure on demand, which is calculated using the following equation:

$$PFD_{AVG} = 1 + [(e^{-\lambda t} - 1)/\lambda t] \qquad \text{Eq. (2)}$$

where, again, λ is the failure rate for the element measured in a number of failures per unit of time and t is the elapsed time since the last test of the instrumented function component. In yet other embodiments, the COSIL™ module 114 calculates both $PFD_{INST}$ and $PFD_{AVG}$ for the instrumented function 112.

Although the PFD for the instrumented function 112 is calculated as a function of the PFD of each of the instrumented function components 108, 110, it should be recognized that the PFD for each of the instrumented function components 108, 110 need not be calculated. For example, if one of the instrumented function components 108, 110 has failed (i.e., the instrumented function 112 is in a state of degraded operation), in one embodiment the PFD value for the failed instrumented function component is forced to a predefined value (e.g., 1.0). In this way, a PFD for the instrumented function 112 may be calculated even though one of the instrumented function components 108, 110 has failed.

For example, assume an instrumented function includes two instrumented function components "a" and "b," and the instrumented function fails on demand if both "a" and "b" fail on demand. In non-degraded operation, the probability of failure on demand for the instrumented function is a product of the probability that "a" will fail on demand and the probability that "b" will fail on demand (i.e., P=Pa*Pb). If "a" fails a test, however, then Pa is set equal to 1.0, and the probability that the instrumented function will fail on demand during such degraded operation is P=1*Pb=Pb.

After a probability of failure on demand is calculated for the instrumented function 112 (Step 202), the probability of failure on demand is compared with a designed probability of failure on demand for the instrumented function to establish a variance (Step 204). In one embodiment, the variance is simply the difference (potentially positive or negative) between the designed probability of failure on demand and the calculated probability of failure on demand.

In some embodiments, the designed probability of demand is a designed average probability of failure on demand. As previously discussed, during a design phase of instrumented functions, e.g., safety instrumented functions, a designer typically establishes a test interval period for each instrumented function component in an instrumented function in order to ensure that an average PFD for the instrumented function is maintained below a designed average PFD level.

In other embodiments, the designed probability of failure on demand is a designed instantaneous probability of failure on demand, and the actual instantaneous probability of failure on demand calculated in Step 202 is compared with the designed instantaneous probability of failure on demand.

Next, after a variance is established, the instrumented function components 108, 110 are managed based upon the variance. In one embodiment for example, an alarm is provided when the calculated probability of failure on demand for an instrumented function exceeds a designed probability of failure on demand. In the embodiments where the calculated $PFD_{AVG}$ is calculated, for example, an alarm is produced when the calculated $PFD_{AVG}$ exceeds the designed average probability of failure on demand.

In other embodiments, as described further herein, in addition to alarm feedback, the COSIL™ module 114 provides historical, on-line and predictive reporting of probability of failure on demand values for several instrumented functions. Again, it should be recognized that the COSIL™ system according to several embodiments tracks test information (and in some embodiments environmental conditions) for several instrumented function components within each of the instrumented functions to arrive at a calculated probability of failure on demand for each respective instrumented function. As a consequence of this wealth of information, a plant engineer is provided with many more management options than prior plant management methodologies.

For example, it is often advantageous to perform tests, albeit outside of the prescheduled test regimen, on instrumented function components while a portion of a plant process is shut down for repairs. Testing one or more instrumented function components 108, 110 in the instrumented function 112 before their respective scheduled test dates, however, decreases the probability of failure on demand (PFD) and increases the risk reduction factor (RRF) for the associated instrumented function. Because the present invention, according to several embodiments, provides feedback indicating a resulting probability of failure on demand due to the unscheduled testing, a plant engineer is able to manage both the tested instrumented function components in the instrumented function and other instrumented function components that were not tested based upon the unscheduled testing.

For example, if the calculated $PFD_{AVG}$ after the unscheduled testing is reduced substantially below a designed average probability of failure on demand, instead of shutting a process down (and losing productivity) to test other instrumented function components according to their designed schedule, a plant engineer may wait, e.g., until a planned shutdown, with the knowledge that the $PFD_{AVG}$ for the instrumented function is still below the designed probability of failure on demand. Thus, the present embodiment allows a plant engineer to take credit for testing in advance of a scheduled test date, and potentially save a substantial amount of money by keeping a process running longer than would otherwise be possible using prior methodologies.

Similarly, in one embodiment the present invention allows a plant engineer to establish a risk if testing of an instrumented function component was not performed as scheduled. This is a significant advantage over prior management methodologies, which leave a plant engineer unsure of whether the actual $PFD_{AVG}$ or $PFD_{INST}$ level exceeds a designed PFD level.

Furthermore, in several embodiments the present invention allows a plant engineer to take credit for replacement of instrumented function components. Prior methodologies, which merely establish a fixed test schedule to maintain an acceptable PFD and risk reduction factor (RRF), simply do not provide the means for a plant engineer to take into consideration the effects of replacing several instrumented function components at different times. The present invention according to these several embodiments, however, is able to track both replacement of instrumented function components and variances between actual testing and a designed test schedule to allow a plant engineer to take credit for any increased risk reduction factor (RRF).

Yet another advantage of some embodiments of the present invention is the ability to establish $PFD_{AVG}$ or $PFD_{INST}$ as a function of environmental conditions including, e.g., temperature, pressure and/or humidity. In these embodiments, a plant engineer may adjust the test interval or environmental conditions to maintain a $PFD_{AVG}$ or $PFD_{INST}$ in response to varying environmental conditions. In contrast, a plant engineer operating under prior management methodologies cannot tell what effect changes in environmental conditions have on the actual average PFD for any instrumented function. As discussed, prior plant management methodologies included a predetermined testing schedule that assumed a set of environmental conditions.

Figure 3:
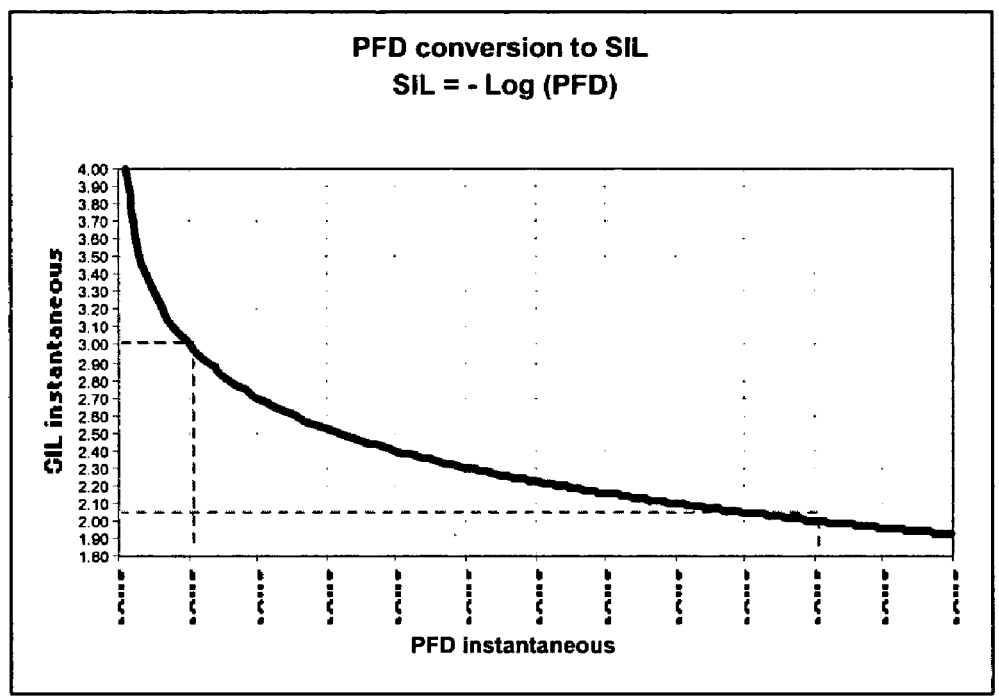
FIG. 3 is a is a graph depicting the relationship between safety integrity level and probability of failure on demand.

In some embodiments, the calculated probability of failure on demand values (i.e., $PFD_{INST}$ and/or $PFD_{AVG}$), for safety instrumented functions are converted to safety integrity levels. Referring to FIG. 3 for example, shown is a graph depicting the relationship between safety integrity level and probability of failure on demand. As shown, the relationship is determined by the following equation:

$$SIL = -Log(PFD) \quad \text{Eq. (3)}$$

Consequently, based on the on-line calculation of the $PFD_{AvG}$ and/or $PFD_{INST}$, a corresponding $PFD_{AVG}$ and/or $SIL_{INST}$ may be calculated as a real number. Thus, a plant engineer is able to monitor calculated SIL values over time and deduce trends based upon the changes in the SIL level over time. For example, if continuous online SIL levels of 3.3, 3.2, and 3.1 have been respectively calculated over three previous months, a plant engineer is able to determine that the SIL level is about to change from a SIL 3 to a SIL 2, and the plant engineer is able to take action to raise or maintain the SIL level.

It should be recognized that in the context of a safety system, the present invention in several embodiments is applicable to both PFD/SIL calculations based on continuous (high demand) mode of operation and low demand operation.

Although online calculation of average probability of failure on demand $PFD_{AVG}$ for an instrumented function provides a wealth of information heretofore unavailable to a plant engineer, the ability to calculate an instantaneous probability of failure on demand $PFD_{INST}$ provides even more information to a plant engineer. An average probability of failure on demand, for example, does not provide information about the range of probability of failure on demand values that an instrumented function may render during a period that the $PFD_{AVG}$ is determined.

Figure 4:
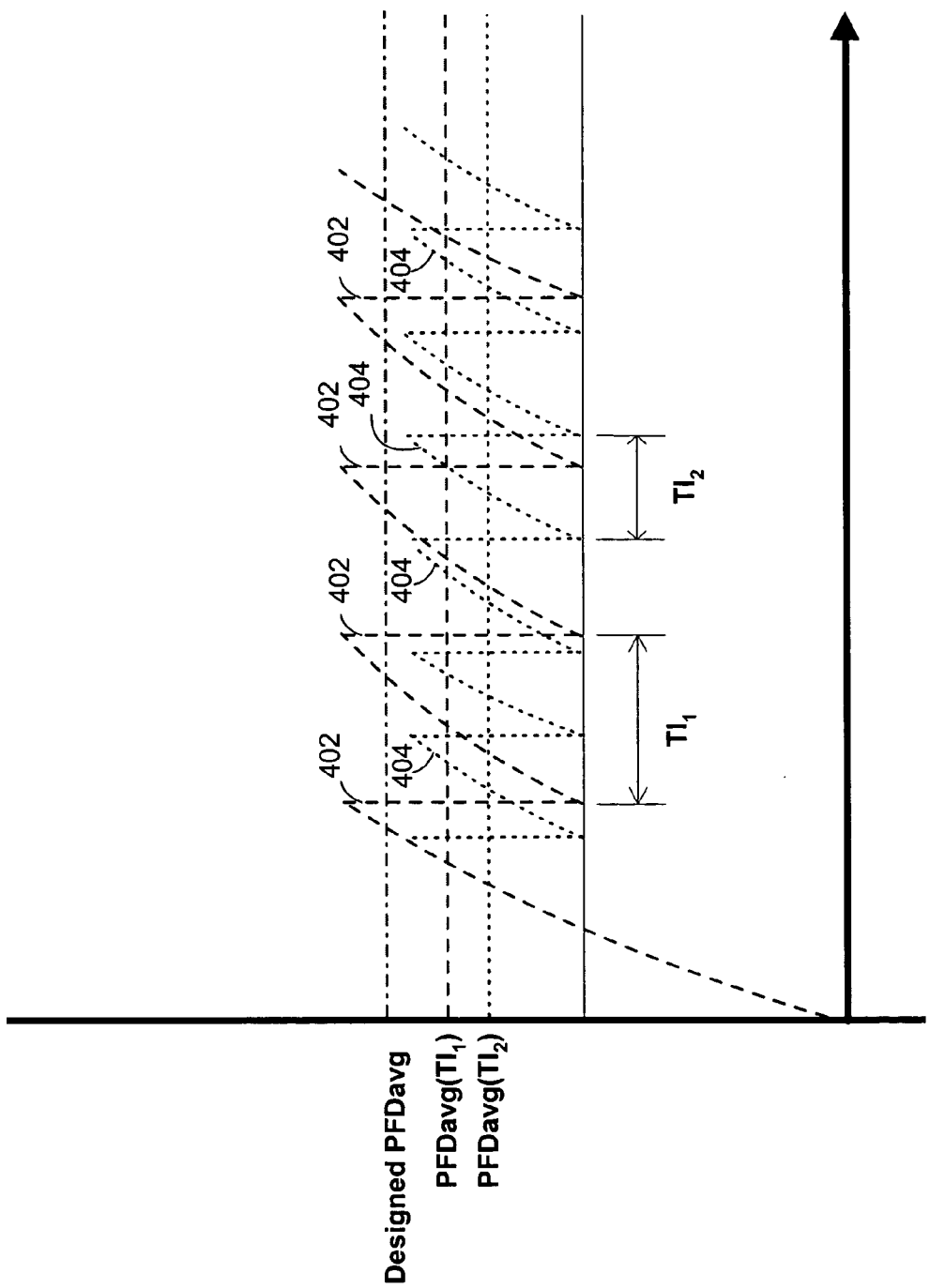
FIG. 4 is a is a graph, which depicts a range of values which an instantaneous probability of failure on demand traverses during a period of time for two different test intervals.

Referring next to FIG. 4, shown is a graph depicting the probability of failure on demand for an instrumented function with respect to time for two different test intervals. Shown is a first graph 402 of an instantaneous probability of failure on demand for an instrumented function tested with an interval $TI_1$. Also shown is a second graph 404 of an instantaneous probability of failure on demand for the same instrumented function, which is tested at an interval $TI_2$.

Although the test interval $TI_1$ produces an average probability of failure on demand ($PFD_{avg}TI_1$) which is below a designed average probability of failure on demand (Designed $PFD_{avg}$), there are significant periods of time during which the actual probability of failure on demand exceeds a designed average probability of failure on demand (Designed $PFD_{avg}$). This graph indicates that a plant engineer without instantaneous PFD information may erroneously be led to believe that the instrumented function is providing a continuous risk reduction factor (RRF), when in fact it is not.

By providing instantaneous probability of failure on demand information to a plant engineer, the plant engineer is able to recognize potential problems, e.g., when the instantaneous PFD exceeds a designed maximum, and make adjustments to test intervals and/or environmental conditions to bring the PFD and RRF of the instrumented function into an acceptable range.

As shown in FIG. 4, by decreasing the test interval to $TI_2$ for example, the instantaneous probability of failure on demand 404 for the instrumented function at all times is maintained below the designed average probability of failure on demand (Designed $PFD_{avg}$).

Figure 5:
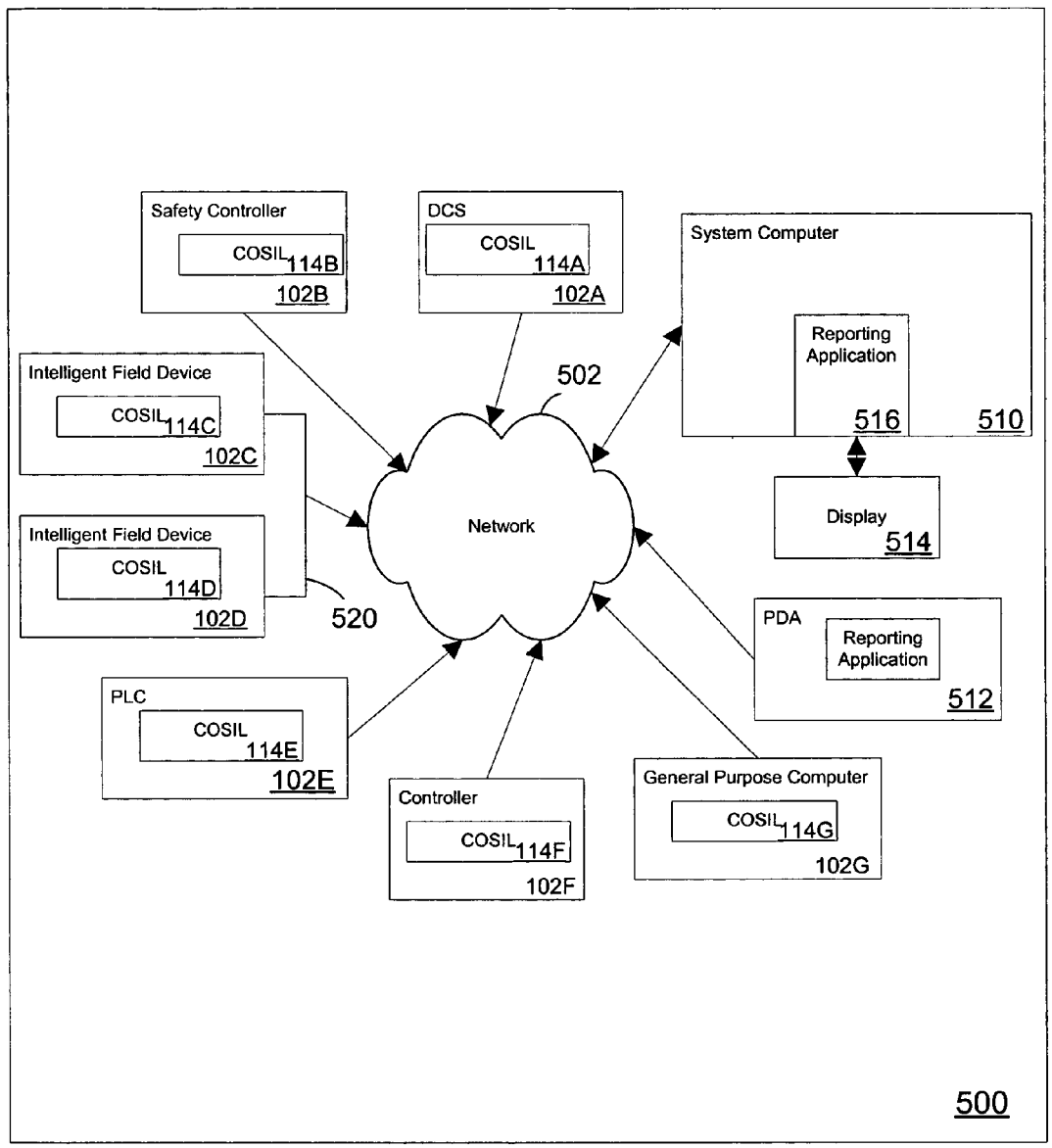
FIG. 5 depicts an industrial system in which another embodiment of the safety and reliability monitoring system is implemented.

Referring next to FIG. 5, shown is an industrial system or plant 500 in which another embodiment of the COSIL™ system is implemented. As shown, coupled to a network 502 are several programmable devices 102A through 102G including a DCS system 102A, a safety controller 102B, two intelligent field devices 102C, 102D coupled by a field bus 520, a programmable logic controller (PLC) 102E, a controller 102F and a control computer 102G. As shown, within each of the programmable devices is a respective COSIL™ module 114A through 114G. Also shown coupled to the network 502 are a system computer 510 and a personal digital assistant 512.

In the present embodiment, each of the programmable devices 102A–102G are coupled to instrumented function components (not shown) that implement one or more instrumented functions, e.g., safety instrumented functions. The programmable devices 102A–102G are also coupled via the network 502 to a system computer 510 and a personal digital assistant 512. Although the programmable devices 102A–102G are able to communicate with the system computer 510 and the personal digital assistant (PDA) 512 via the network 502, it should be recognized that the programmable devices 102A–102G do not necessarily communicate with each other.

One of ordinary skill in the art will recognize that a variety of network systems may be implemented to provide a communication path between each of the programmable devices 102A–102G and the system computer 510 and/or the personal digital assistant (PDA) 512. A wireless network, for example, may be utilized as part or all of the network 502.

In the present embodiment, each of the programmable devices 102A–102G includes a respective COSIL™ module 114A–114G for calculating a $PFD_{INST}$ and/or a $PFD_{AVG}$ for each of their respective instrumented functions. It should be recognized that some of the programmable devices 102A–102G may receive operating information from more than one instrumented function. For example, each of the programmable devices 102A–102G may be associated with more than one instrumented function, and each instrumented function may include more than one instrumented function component.

In operation, each programmable device 102A–102G, and hence, each respective COSIL™ module 114A–114G receives operating information, e.g., test and/or environmental information, about its associated instrumented function components, and calculates a probability of failure on demand for the instrumented function associated with the instrumented function components.

In this embodiment, the calculated probability of failure on demand for one or more instrumented functions is forwarded via the network 502 to the system computer 510 where it is provided by a reporting application 516 to the display 514. As discussed further herein, information including a designed SIL level, an on-line SIL level and instantaneous PFD as well as deviation lights/alarms may be displayed on the display 514.

As previously discussed, the probability of failure on demand may be converted to a SIL level for convenient reporting to a user at the system computer 510 and/or the personal digital assistant 512. One of ordinary skill in the art will recognize that conversion from a probability of failure on demand to a SIL level may be calculated either in the programmable devices 102A–102G (e.g., in the respective COSIL™ modules 114A–114G) or the system computer 510.

In one embodiment, calculated probability of failure on demand values for each instrumented function are forwarded to the personal digital assistant (PDA) 512 (e.g., via a wireless link). The personal digital assistant 512 may be any portable computing device with programming and reporting capability including, but not limited to, cellular telephones and notebook computers. The portable aspect of the PDA allows a plant manager to receive alarms and/or generate reports without being "tied" to a desktop-type computer.

Figure 6:
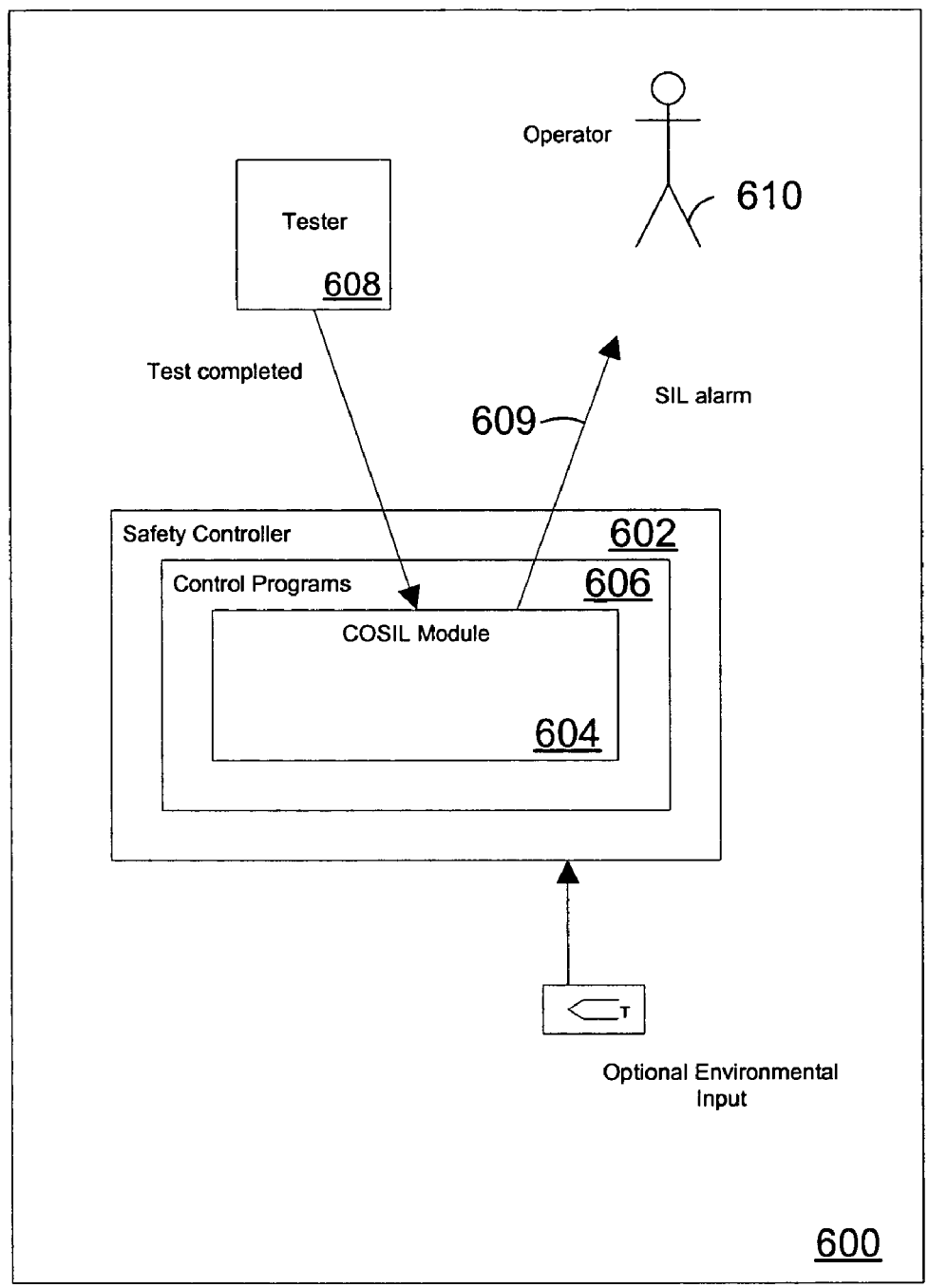
FIG. 6 depicts one embodiment of the safety controller of FIG. 5 in accordance with one embodiment of the present invention.

Referring next to FIG. 6, shown is one embodiment of the safety controller 102B of FIG. 5 in accordance with one embodiment of the present invention. As shown in FIG. 6, the safety controller 602 includes a COSIL™ module 604 located within a control programs portion 606 of the safety controller 602 and is in communication with a tester 608 to receive information about testing of instrumented function components in a plant 600. Also shown is an environmental input, which may be utilized along with the information about testing to calculate an average probability of failure and/or an instantaneous probability of failure on demand for an instrumented function based upon the test and environmental information.

In some embodiments, the tester 608 is an operator that inputs test information manually into the safety controller 602, and in other embodiments, the tester 608 is an automated test feedback device that updates the COSIL™ module 604 automatically with any test information.

As depicted in FIG. 6, the safety controller 602 provides an alarm 609 to an operator 610 without communicating via the network 502. In one embodiment, for example, the safety controller 602 does not communicate any PFD or SIL information to other devices and simply provides an alarm if any instrumented functions have a PFD level that rises above a designed PFD level.

Figure 7:
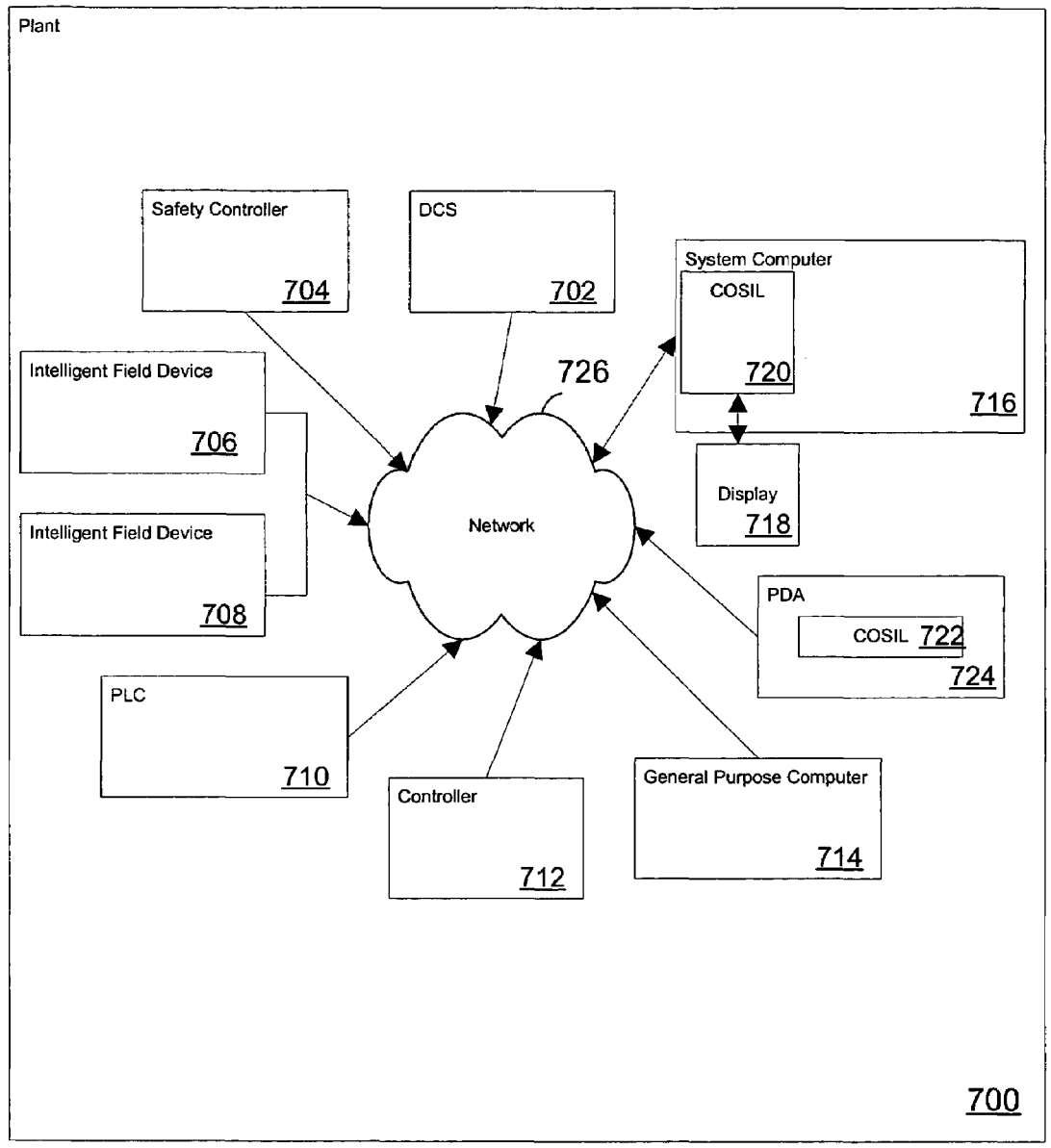
FIG. 7 depicts an industrial system in which the safety and reliability monitoring system is centrally operated according to one embodiment of the present invention.

Referring next to FIG. 7, shown is an industrial system 700 in which the COSIL™ system is centrally operated according to one embodiment of the present invention. As shown in FIG. 7, the present embodiment includes a collection of programmable devices 702, 704, 706, 708, 710, 712, 714, which include the same type of programmable devices described with reference to FIG. 5, but in the present embodiment, a system computer 716 calculates PFD information for each of the safety instrumented functions and provides, via a display 718, PFD and/or SIL information for each of the instrumented functions.

It should be recognized that each of the programmable devices is associated with an instrumented function (e.g., the instrumented function 112), and each instrumented function includes instrumented function components (e.g., the instrumented function components 108, 110). For clarity, however, the associated instrumented functions and instrumented function components are not shown.

Figure 7A:
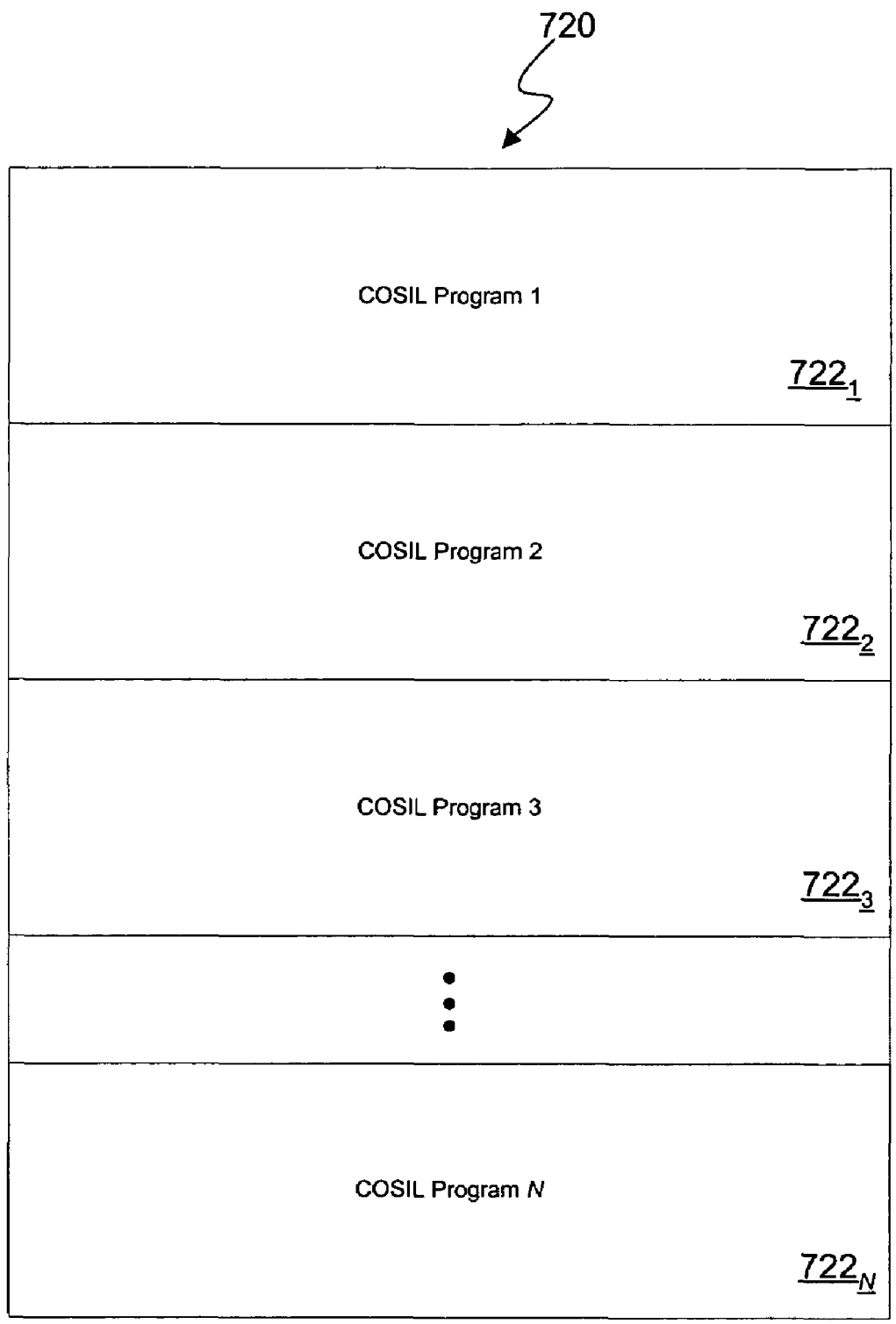
FIG. 7A depicts one embodiment of the COSIL™ module of FIG. 7.

Referring briefly to FIG. 7A, shown is the COSIL™ module 720 of FIG. 7 according to one embodiment. As shown, the COSIL™ module 720 includes N separate COSIL™ programs $722_1$–$722_N$ that correspond to N respective instrumented functions in the plant 700. In one embodiment, each of the programmable devices 702, 704, 706, 708, 710, 712, 714 forwards operating information (e.g., test information) to the system computer 716 and/or the PDA 724 about each of the instrumented function components that the programmable device is associated with. In another embodiment, operating information (e.g., test information) about instrumented function components is provided to the system computer 716 by manual entry of a user (e.g., as tests are performed).

Each of the COSIL™ programs $722_1$–$722_N$ in the COSIL™ module 720 is associated with a corresponding one of N instrumented functions and tracks operating information for each instrumented function component (e.g., each of the instrumented function components 108, 110) in the corresponding instrumented function (e.g., the instrumented function 112). Based on the operating information, each of the COSIL™ programs $722_1$–$722_N$ calculates, on an ongoing basis, the probability of failure on demand for the corresponding one of the N instrumented functions. In this way, the system computer 716 is able to provide alarms responsive to actual plant events and/or conditions. As discussed herein, the COSIL™ module 720 in some embodiments also includes historical and predictive reporting capabilities in addition to on-line reporting.

Referring back to FIG. 7, the COSIL™ module 722 in an exemplary embodiment is implemented in a personal digital assistant (PDA) 724. In this embodiment, the COSIL™ module 722 operates in much the same way as the COSIL™ module 720 in the system computer 716, i.e., the COSIL™ module 722 tracks operating information for each instrumented function component in each instrumented function and calculates, on an ongoing basis, the probability of failure on demand for each monitored instrumented function. In addition, the COSIL™ module 722 may generate alarms and reports for a user, but this is not required.

Figure 8:
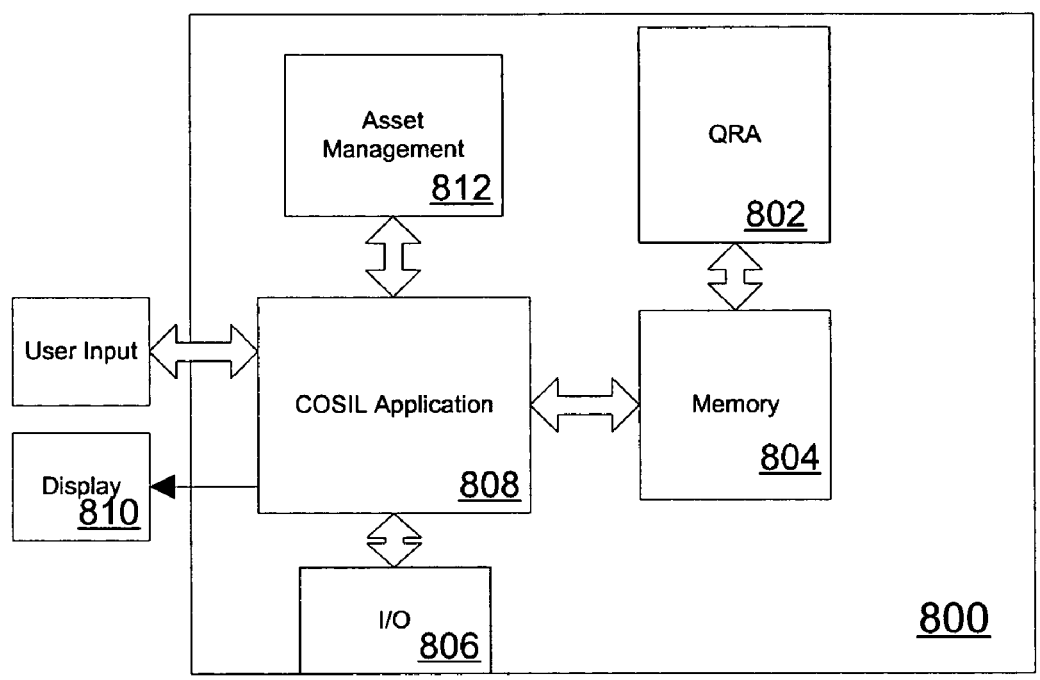
FIG. 8 is one embodiment of a system computer that may be implemented to carry out the functions of the system computers of FIGS. 5 and 7.

Referring next to FIG. 8, shown is one embodiment of a system computer 800 that may be implemented to carry out the functions of the system computers 510, 716 of FIGS. 5 and 7.

As shown, the system computer 800 includes a quantitative risk/reliability analysis (QRA) portion 802, which converts information about each instrumented function into one corresponding COSIL™ program. As discussed, each COSIL™ program (which may be stored in the memory 804, the COSIL™ module 720 of the system computer 716, the COSIL™ module 722 the PDA 724 and/or in the COSIL™ modules 114A–114G of the programmable devices 102A–102G) provides a PFD value for an associated instrumented function (e.g., the instrumented function 112) based on operating information about instrumented function components (e.g., the instrumented function components 108, 110) included in the instrumented function.

In an exemplary embodiment, the QRA portion 802 utilizes function block diagram analysis that allows a user to convert an instrumented function fault tree into a function block diagram. The QRA portion 802 then converts the function block diagram into a COSIL™ program for the instrumented function. In one embodiment, the QRA portion 802 is implemented with a Triconex® TS1131 application, but this is certainly not required.

In one embodiment, to provide assistance to a user converting a fault tree to a function block diagram, the user is provided with one or more electronic files which include a library of function blocks, e.g. AND and OR logic function blocks, along with Eq. (1) and Eq. (2) set forth above. Such function blocks and equations may be tailored to be read and utilized by various QRA software applications including the Triconex® TS1131 application. In addition, in some embodiments, exemplary function block diagrams are provided to the user to further guide the user.

In other embodiments, other QRA methodologies are utilized to create COSIL™ programs for each instrumented function including, but not limited to, structured text techniques, simple equation methodology, Markov modeling and reliability block diagram methodology.

It should be recognized that the QRA portion 802 need not be implemented in the system computer 800, and in other embodiments, the COSIL™ programs are created by the user on other machines, or simply provided to the user (e.g., from a third party).

In some embodiments (e.g., when the system computer 800 is implemented within the system 700 described with reference to FIG. 7), each COSIL™ program is stored in a memory 804 of the system computer and a CPU carries out the instructions in the COSIL™ program to calculate a PFD for each instrumented function. In these embodiments, an input/output (I/O) portion 806 receives (e.g., from the network 726) operating information for instrumented function components in each instrumented function.

In other embodiments (e.g., when the system computer 800 is implemented in the system 500 described with reference to FIG. 5), after a COSIL™ program is created for an instrumented function, it is provided (e.g., uploaded via the network 502), to a programmable device (e.g., one of the programmable devices 102A–102G) where it is stored and carried out by a CPU on the programmable device. In these embodiments, the I/O portion 806 receives PFD and/or SIL information from programmable devices (e.g., the programmable devices 102A–102G) for instrumented functions that are associated with each programmable device. In one embodiment, Foundation Fieldbus function blocks may be uploaded along with the COSIL™ programs to the COSIL™ modules 114C, 114D of the intelligent filed devices 102C, 102D (which are compatible with the Foundation Fieldbus protocol).

In yet other embodiments, COSIL™ programs are stored in one or more programmable devices in addition to the system computer 800. Thus, implementations that combine aspects of each of the systems 500, 700 described with reference to FIGS. 5 and 7 are well within the scope of the present invention.

Also shown in the system computer 800 is a COSIL™ application 808. In several embodiments the COSIL™ application includes code to produce a graphical user interface on the display 810, which provides user feedback and user controls (e.g., icons) that allow a user to request several variations of reports for the instrumented functions. For example, information including design SIL levels, continuous PFD and/or SIL levels and instantaneous PFD levels may be displayed for each instrumented function on an ongoing basis. Moreover, alarm information is provided via the display for each instrumented function.

In an exemplary embodiment, the COSIL™ application 808 allows a user to analyze historical and future probabilities of failure for each instrumented function in addition to on-line PFD information. Historical operating information for historical analysis may be stored in the memory 804, or may gathered based on retained records (e.g., test records). Beneficially, such historical analysis may be used to reconstruct what the PFD levels were at the time of a prior event. For example, if a plant experienced a boiler explosion, a historical analysis may be performed to determine PFD levels for instrumented functions associated with the boiler. Such historical analysis may provide probative information during an accident investigation of such an event.

The COSIL™ application 808 also allows a user to predict future PFD and or SIL levels. For example, a user is able to enter a hypothetical scenario, which includes a future date and a set of assumed conditions (e.g., assumed test intervals and/or environmental conditions). Based upon the information provided by the user, the COSIL™ application 808 calculates PFD and/or SIL values for the instrumented function for the future date based upon the assumed conditions. This functionality allows a plant engineer to test various potential courses of action and make an informed decision based on the results provided by the COSIL™ application 808.

Moreover, the COSIL™ application 808 allows future PFD and/or SIL levels to be predicted based upon historical PFD information. Specifically, the COSIL™ application according to one embodiment, tracks and reports PFD and/or SIL level changes for each instrumented function over a period of time. Based upon the tracked information, trends may be established allowing a user to predict when an instrumented function is about to drop below a designed SIL level. As discussed, SIL levels may be reported as real numbers to allow small changes in SIL levels to be perceived by the user.

Also shown is an asset management application 812, which according to an exemplary embodiment both receives information from the COSIL™ application 808 and provides information to the COSIL™ application 808. Specifically, the asset management application 812 tracks replacement of instrumented function components, and when an instrumented function component is replaced, the asset management application 812 informs the COSIL™ application 808. In this way, the COSIL™ application 808 is able to update the COSIL™ program that is associated with the replaced instrumented function component. In turn, the COSIL™ program resets the elapsed time associated with the instrumented function component as though a test were just performed on the replaced instrumented function component.

Conversely, when a test is performed on an instrumented function component, the COSIL™ application 808 receives test information indicating whether the test was successful or not and provides the asset management application 812 with the test information. In this way the asset management application 812 is provided up to date status information for instrumented function components.

It should be recognized that information between the asset management application 812 and the COSIL™ application 808 may be transferred according to various techniques. For example, each application 808, 812 may be configured to communicate according to the other application's specific application program interface (API). Alternatively, the applications 808, 812 may exchange information according to well-known communication formats (e.g., using extensible markup language (XML)).

It should also be recognized that the asset management application 812 may be located remotely from the system computer 800 and communicate with the COSIL™ application 808 via a network connection.

While the invention herein disclosed has been described by means of specific embodiments and applications thereof, numerous modifications and variations could be made thereto by those skilled in the art without departing from the scope of the invention set forth in the claims.

For example, the present invention is readily adaptable to providing online mean time to failure (MTTF) information for an instrumented function. As one of ordinary skill in the art will appreciate, the quantitative risk/reliability (QRA) methodologies utilized to provide a COSIL™ program may be modified so that the COSIL™ program calculates MTTF values instead of probability of failure on demand (PFD) values. Although testing intervals are typically not part of an MTTF calculation, it is contemplated that operating information including notice of a failure of an instrumented function component will be utilized in such a calculation.

Although instrumented function components are typically replaced quickly upon failure, knowledge of the MTTF value while an instrumented function component is non-functional provides a plant engineer with information to make a more informed decision about operating the instrumented function until the instrumented function component is replaced.

What is claimed is:

1. A method for managing a safety instrumented function including a plurality of instrumented function components, the method comprising:
   obtaining a test completion time for at least one of the plurality of instrumented function components;
   determining a probability of failure on demand for the safety instrumented function based on the test completion time;
   comparing the probability of failure on demand with a designed probability of failure on demand for the safety instrumented function to establish a variance; and
   managing the plurality of instrumented function components based on the variance.

2. The method of claim 1 wherein the probability of failure on demand is an instantaneous probability of failure on demand.

3. The method of claim 1 wherein the probability of failure on demand is an average probability of failure on demand.

4. The method of claim 1, wherein the test completion time is a future test completion time, and wherein the determining the probability of failure on demand is performed before the future test completion time.

5. The method of claim 1 wherein the obtaining includes obtaining an indication that the at least one of the plurality of instrumented function components has failed.

6. The method of claim 5 including:
   setting a probability of failure on demand for the at least one of the plurality of instrumented function components to a predefined value;
   wherein the determining includes calculating the probability of failure on demand for the safety instrumented function as a function of the probability of failure on demand for the at least one of the plurality of instrumented function components.

7. The method of claim 6 wherein the obtaining comprises obtaining environmental operating information.

8. The method of claim 7 wherein the environmental operating information includes information selected from the group consisting of: temperature information, pressure information and humidity information.

9. The method of claim 1 wherein the obtaining further includes:
   obtaining operating information about each of the plurality of instrumented function components;
   wherein the determining includes calculating probability of failure on demand for each of the plurality of instrumented function components as a function of corresponding operating information received for each of the plurality of instrumented function components, thereby generating a plurality of probability of failure on demand values; and
   wherein the probability of failure on demand for the safety instrumented function is determined as a function of the plurality of probability of failure on demand values.

10. The method of claim 1 wherein the managing comprises reducing a test interval between tests of the at least one of a plurality of instrumented function components in response to the variance exceeding a maximum variance.

11. The method of claim 1 wherein the managing comprises reducing a test interval between tests of another of the plurality of instrumented function components in response to the variance exceeding a maximum variance.

12. A system for managing a safety instrumented function including a plurality of instrumented function components, the system comprising:
   means for obtaining a test completion time for at least one of the plurality of instrumented function components;
   means for determining a probability of failure on demand for the safety instrumented function based on the test completion time;
   means for comparing the probability of failure on demand with a designed probability of failure on demand for the safety instrumented function to establish a variance; and
   means for providing, based on the variance, information useable for managing the plurality of instrumented function components.

13. The system of claim 12, wherein the probability of failure on demand is an instantaneous probability of failure on demand.

14. The system of claim 12, wherein the probability of failure on demand is an average probability of failure on demand.

15. The system of claim 12, wherein the test completion time is a future test completion time, wherein the means for determining the probability of failure on demand includes means for determining the probability of failure on demand before the future test completion time.

16. The system of claim 12 wherein the means for obtaining comprises means for obtaining environmental operating information.

17. The system of claim 16, wherein the environmental operating information includes information selected from the group consisting of: temperature information, pressure information and humidity information.

* * * * *